(12) United States Patent
Schaeffer et al.

(10) Patent No.: US 6,263,651 B1
(45) Date of Patent: Jul. 24, 2001

(54) PIVOTING BASKET HOOD

(75) Inventors: Travis A. Schaeffer, Davenport, IA (US); Robert S. Davis, East Moline, IL (US); Michael J. Covington, Bettendorf, IA (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/212,917

(22) Filed: Dec. 16, 1998

(51) Int. Cl.[7] .......................... A01D 46/10; A01F 12/60
(52) U.S. Cl. ................................ 56/30; 460/119
(58) Field of Search .................. 56/31, 30; 460/119, 460/115, 23; 292/42, 41, 33, 162, 32

(56) References Cited

U.S. PATENT DOCUMENTS

| | | | |
|---|---|---|---|
| 1,242,509 | * 10/1917 | Zatzkin | 292/42 |
| 1,653,184 | * 12/1927 | Kolumbus | 292/42 |
| 2,235,609 | * 3/1941 | Davis | 222/528 |
| 2,699,280 | * 1/1955 | Saneholtz | 222/528 |
| 4,271,659 | 6/1981 | McConnell . | |
| 4,660,359 | 4/1987 | Deutsch . | |
| 4,817,370 | 4/1989 | Deutsch et al. . | |
| 4,930,299 | * 6/1990 | McBee | 56/31 |
| 5,189,870 | * 3/1993 | Hohnl | 56/320.2 |
| 5,556,338 | * 9/1996 | Covington | 460/119 |
| 5,616,077 | * 4/1997 | Covington et al. | 56/30 |
| 5,667,111 | * 9/1997 | Robinson et al. | 222/528 |

FOREIGN PATENT DOCUMENTS

SU 1819526  6/1993 (SU) .
SU 1825295  6/1993 (SU) .

* cited by examiner

*Primary Examiner*—Thomas B. Will
*Assistant Examiner*—Meredith C Petravick
(74) *Attorney, Agent, or Firm*—A. Nicholas Trausch; J. William Stader; Larry W. Miller

(57) ABSTRACT

An agricultural apparatus is disclosed herein for the harvesting of a low-density crop such as cotton. The agricultural apparatus includes a frame, a crop acquiring device associated with the frame; a crop collecting bin, or basket, which is supported by the frame, adjustable in position with respect to the frame, and provided with an opening in a wall of the basket for conveying of crop into the basket; a conveying device for conveying of crop from the acquiring device to the basket and having a first end associated with the acquiring device and a second end associated with the basket opening; and a hood pivotally attached to the basket for selectively covering the basket opening and for engaging the second end of the conveying device. The hood may include one or more latching apparatus for securing the hood in an opened position and in a closed position. The latching apparatus may be of the barrel, bolt, and keeper type, and may be disposed at a first end, a second end, or first and second ends of the hood. Also disclosed is a method of preparing a cotton picker for transport, including the step of pivoting a hood from an opened position to a closed position.

11 Claims, 4 Drawing Sheets

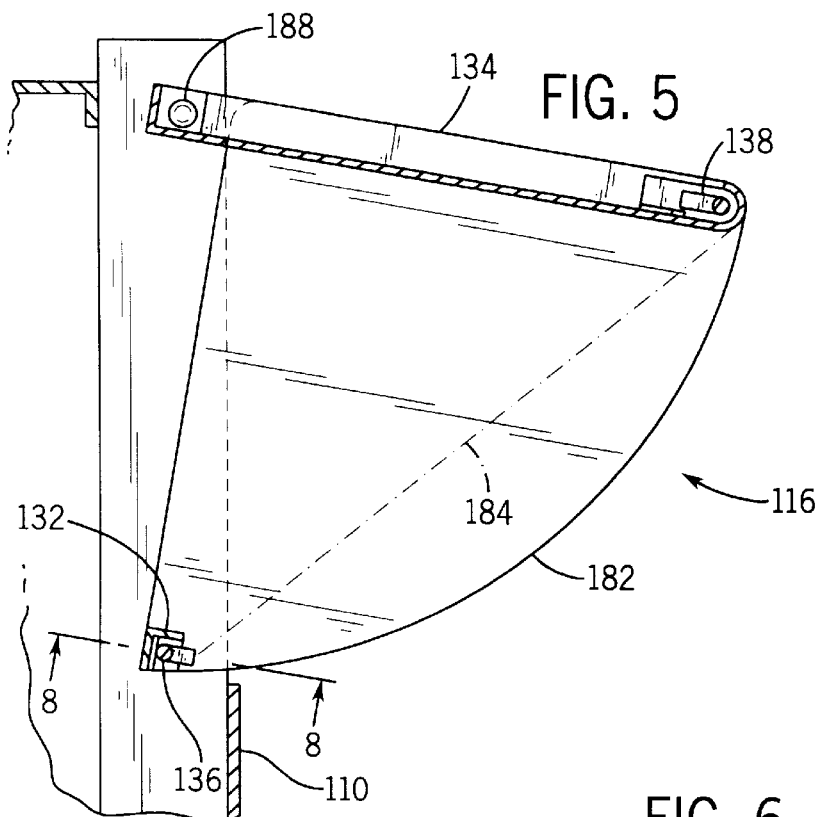
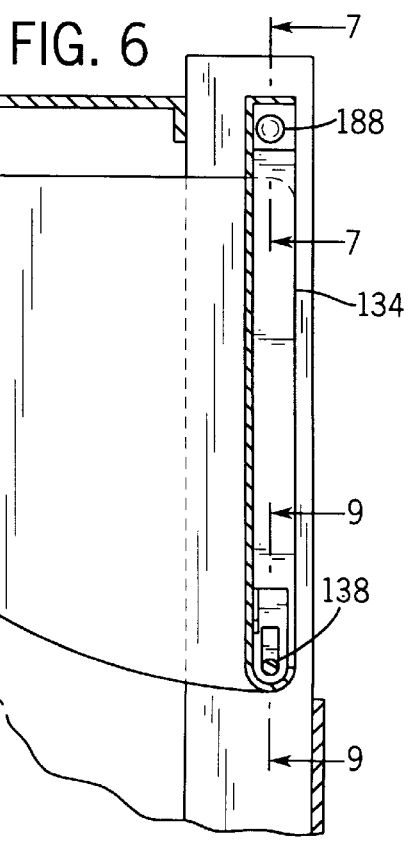
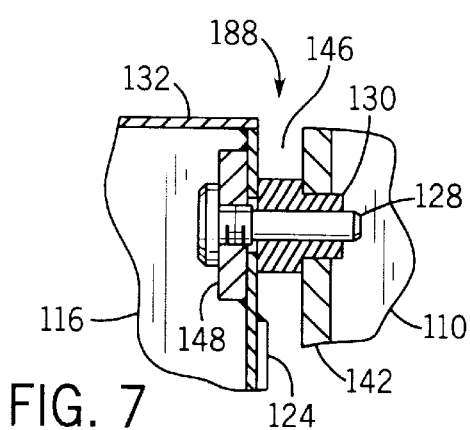

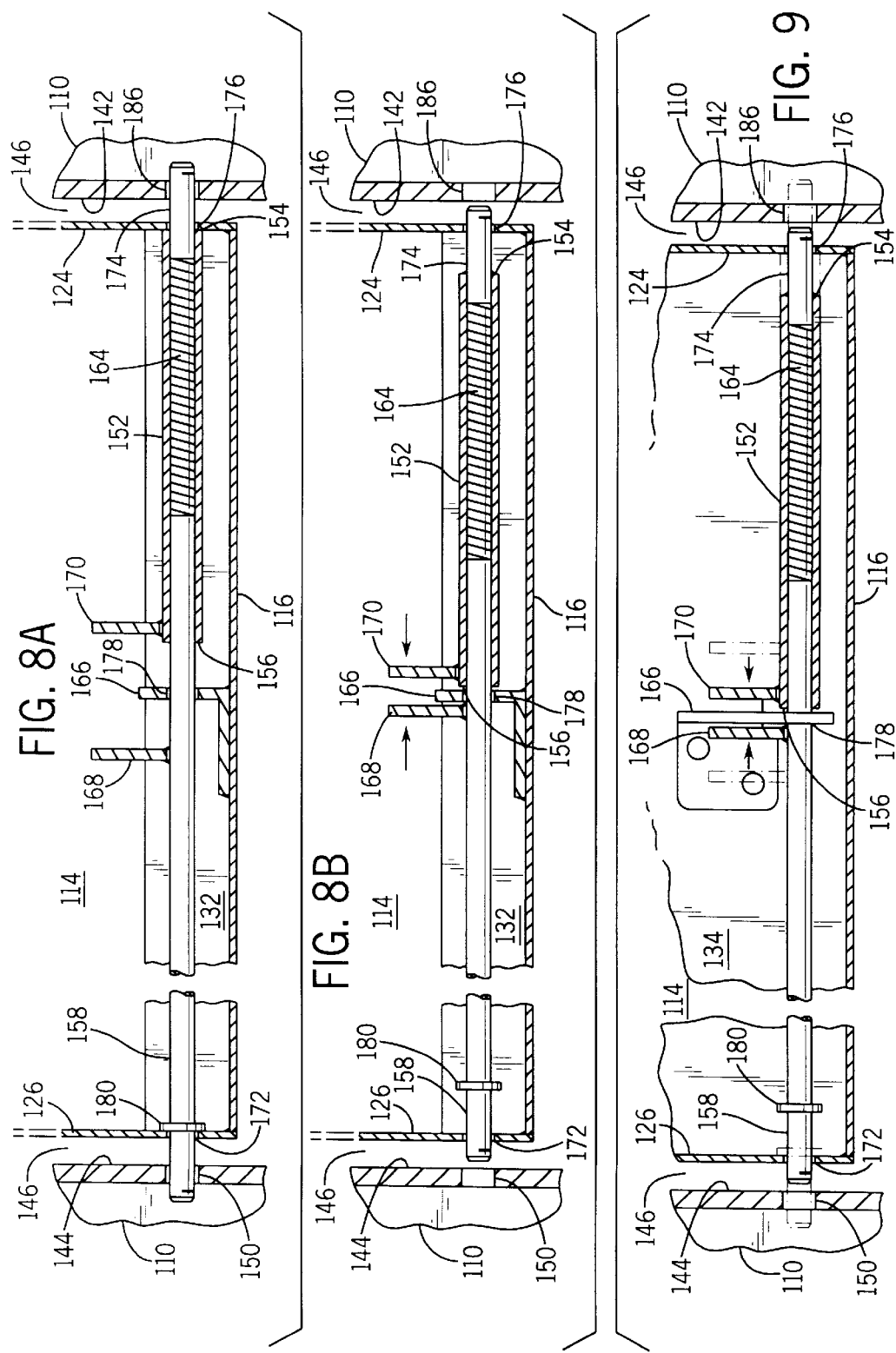

PIVOTING BASKET HOOD

FIELD OF THE INVENTION

The present invention relates to an agricultural crop harvesting apparatus having a crop conveying device for conveying of crop to a bin, or basket. More particularly, the present invention relates to a hood associated with the basket of a cotton picker for engaging of a pneumatic cotton conveying device.

BACKGROUND OF THE INVENTION

Cotton harvesting machines, or cotton pickers, are agricultural work apparatus provided with a crop acquiring device to remove, or pick, cotton bolls from plant stalks and a conveying device to convey the bolls to a collecting bin, or basket. The baskets are large, to maximize the amount of low-density cotton which can be stored and thereby minimize the number of times the cotton picker must be stopped to empty a full basket into an adjacent truck or trailer.

Bolls are typically pneumatically conveyed from the acquiring device to the basket. A fan is provided on the cotton picker to move air into the region of the crop acquiring device, where the crop acquiring device delivers cotton bolls into the air stream. One or more generally vertically disposed, pipe-like chutes delivers bolls, entrained in the moving air, from the crop acquiring device to the basket through an opening near the top of a wall of the basket. A hood is provided at the opening, projecting outwardly from the basket wall, to surround a portion of the chute in order to keep the chute engaged with the opening and to help guide cotton bolls into the basket.

The basket is raised from its operating position for unloading, so that the cotton can fall by gravity from an unloading door in a side of the basket into an adjacent truck or trailer. The hood is affixed to the basket and therefore rises with the basket when the basket is raised, while the chute is affixed to the frame of the cotton picker and hence does not rise with the basket. A hood is therefore generally not provided a bottom member to complete the surrounding of the end of the chute, so that the hood can rise with the basket without interfering with the chute.

The basket therefore has a lower operating position and a higher unloading position. The basket is high enough, even in its lower operating position, to interfere with some overhead objects such as tree limbs and utility lines which, while not generally found in cotton fields, are more likely to be encountered during shipping and during routine transport of the cotton picker from, e.g., the farmstead to the field. An upper portion of the basket is therefore provided a third, still lower, "transport" position wherein it telescopes within a lower portion of the basket so that the top of the basket is flush with, or slightly lower than, the top of the cab of the cotton picker or otherwise low enough to not interfere with overhead objects.

In order to lower the upper portion of the basket, it is necessary to first eliminate dimensional interferences; e.g., projection of hoods outside the dimensional envelope of the upper portion of the basket. This has heretofore been accomplished by constructing and mounting the hood in the manner of a drawer within a furniture case; i.e., by providing it an operating position wherein it is slid outwardly and a transport position wherein it is slid inwardly. Such a manner of construction, however, tends to produce a heavy hood, difficult to slide, due to the depth required of a drawer-like construction in order to not cock and bind the hood within its slides. The degree of difficulty becomes more apparent when one considers that most cotton pickers are multi-row machines having more than one hood, and that transport routes presenting a height-related problem necessitate changing the positions of the hoods upon every arrival to, and every departure from, a field on that route.

It would be advantageous for a cotton picker to have a hood provided an operating, or open, position wherein it projects outside the dimensional envelope of a basket to engage a chute, and a transport, or closed, position wherein it does not project outside the basket, while not requiring undue effort in the changing of positions.

It would also be advantageous for a cotton picker to have a hood which is compact, whereby the hood and any associated structure will project minimally into a basket and be economical to manufacture and maintain. It would further be advantageous for a cotton picker to have a hood which includes easily operated latching apparatus of positive action for securing the hood in its operating and transport positions.

SUMMARY OF THE INVENTION

The present invention relates to an agricultural apparatus for the harvesting of a low-density crop such as cotton and including a frame, a crop acquiring device associated with the frame; a crop collecting bin, or basket, supported by the frame, adjustable in position with respect to the frame, and having a basket opening in a wall of the basket for conveying of crop into the basket; a conveying device for conveying of crop from the acquiring device to the basket and having a first end associated with the acquiring device and a second end associated with, and located in the region of, the basket opening; and a hood pivotally attached to the basket for selectively covering the basket opening and for engaging the second end of the conveying device.

Another aspect of the present invention relates to a basket hood for an agricultural apparatus used in the harvesting of low density crops such as cotton, the hood pivotally secured to a wall of the basket at an opening in the wall.

Another aspect of the present invention relates to a method of preparing an agricultural crop harvesting apparatus for transport, including the steps of unlatching a hood in an opened position wherein the hood projects outside an outer surface of a bin, or basket, pivoting the hood from the opened position to a closed position wherein the hood is at least flush with the outer surface, and latching the hood in the closed position.

DESCRIPTION OF THE DRAWINGS

A full understanding of the invention may be gained from the Drawings taken in conjunction with the Detailed Description below, wherein like reference numerals refer to like parts.

FIG. 5 is a fragmentary right-side sectional elevation view taken at the line 5—5 in FIG. 3 and showing the hood in an open position.

FIG. 6 is a fragmentary right-side sectional elevation view taken at the line 6—6 in FIG. 4 and showing the hood in a closed position.

FIG. 7 is a fragmentary front sectional elevation view taken at the line 7—7 in FIG. 6 and showing of a shaft and bearing of the hood.

FIG. 8A is a fragmentary bottom sectional plan view taken at the line 8—8 in FIG. 5 and showing a first latching apparatus in an engaged position.

FIG. 8B is a fragmentary bottom sectional plan view taken at the line 8—8 in FIG. 5 and showing the first latching apparatus in a disengaged position.

FIG. 9 is a fragmentary front sectional elevation view taken at the line 9—9 in FIG. 6 and showing a second latching apparatus in both engaged (solid lines) and disengaged (phantom lines) positions.

DETAILED DESCRIPTION OF PREFERRED EXEMPLARY EMBODIMENTS

Figure 1:
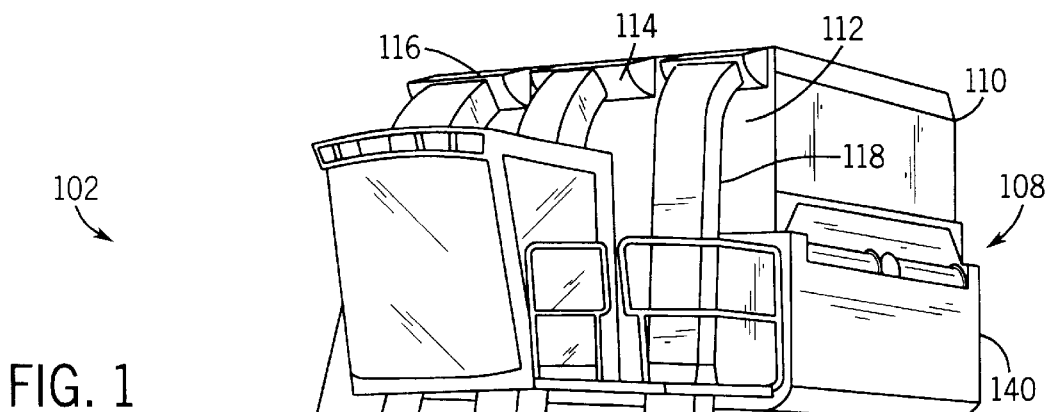
FIG. 1 is a perspective view of an agricultural cotton harvesting apparatus, or cotton picker, depicting a preferred embodiment of the present invention.

FIG. 1 shows an agricultural cotton harvesting apparatus, or cotton picker, 102. Cotton picker 102 removes cotton bolls from their stalks at a crop acquiring device 106, and conveys them through at least one conveying device to a storage bin, or basket, 108. The conveying device may be a pneumatic chute 118 as shown, having a first end 120 associated with crop acquiring device 106 and a second end 122 associated with a hood 116 at an opening 114 (through which cotton bolls enter basket 108) in a wall 112 of basket 108. A hood 116 is provided at each opening 114 and is coupled to wall 112 of basket 108 in a movable manner so that it can be disposed in an open position or in a closed position.

A basket upper portion 110 is vertically movable within and with respect to a lower portion 140 of basket 108. Basket upper portion 110 is shown in a vertical position with respect to basket lower portion 140 which is suitable for operation of cotton picker 102, and chutes 118 and hoods 116 are also shown disposed for operation of cotton picker 102. Hood 116 is in an open position wherein it is engaged with second end 122 of chute 118, assisting in the retention of alignment of chute second end 122 with opening 114 and assisting in the guiding of cotton bolls into basket 108.

Figure 3:
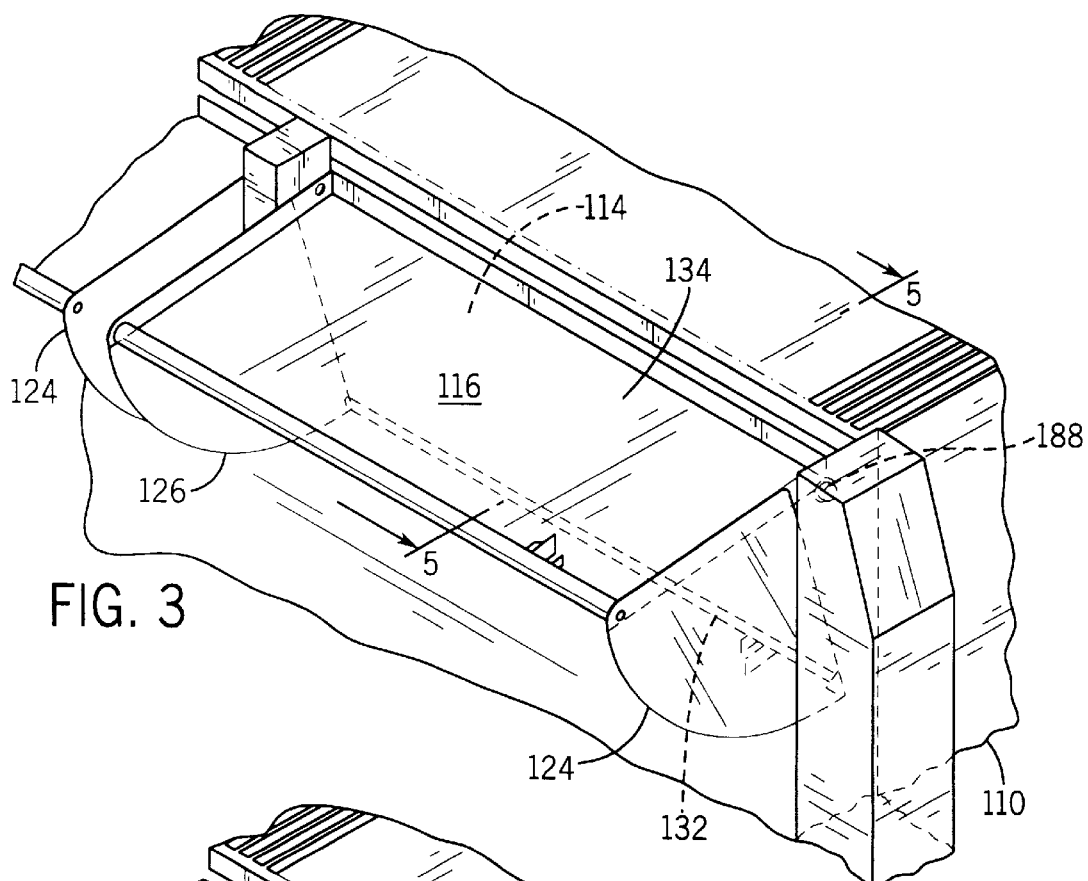
FIG. 3 is a fragmentary perspective view of a portion of the embodiment shown in FIG. 1 in which the hood is in an open position.

Hood 116 is movably mounted to basket upper portion 110, and chute 118 is affixed to a frame 104 of cotton picker 102. Basket 108 is raised to a higher elevation with respect to frame 104 for unloading by gravity (e.g., to an adjacent truck or trailer), and hood 116 rises with basket 108. Chute 118, being affixed to frame 104, does not rise with basket 108. Since chute second end 122 is generally positioned at least partially within hood 116, hood 116 includes a top member 134, a first end member 124, and a second end member 126 (when in an opened position, as shown in FIG. 3). Hood 116 is therefore configured, in a front elevation view, generally as an inverted "U". Hoods do not generally have a member providing a bottom surface, or at least have a substantial portion of a bottom surface omitted, so that the hoods may rise with the associated basket upper portion without interfering with and striking the second ends of associated chutes.

Figure 2A:
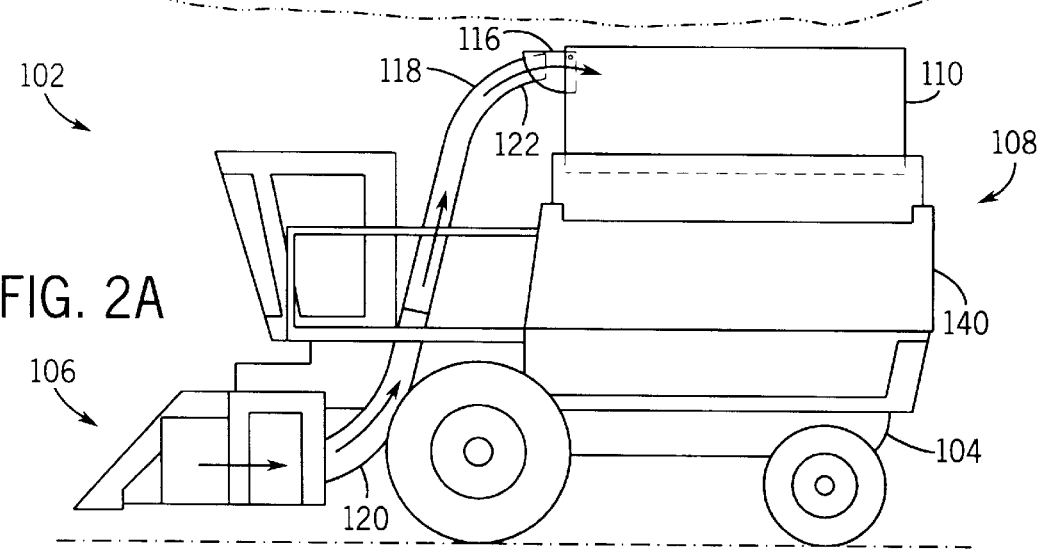
FIG. 2A is a left-side elevation view of the embodiment shown in FIG. 1 in which a hood is in an open position.

FIG. 2A shows cotton picker 102 in operation. Basket upper portion 110 is vertically disposed with respect to basket lower portion 140 and frame 104 at a height suitable for receiving cotton bolls through chute 118, and chute 118 is positioned to convey cotton bolls from crop acquiring device 106 to, and into, basket 108. Directional flow arrows in FIG. 2A show the path of movement of air, and of cotton bolls entrained in the air, through chute 118. The air is caused to flow by a fan or blower (not shown) associated with frame 104.

Figure 2B:
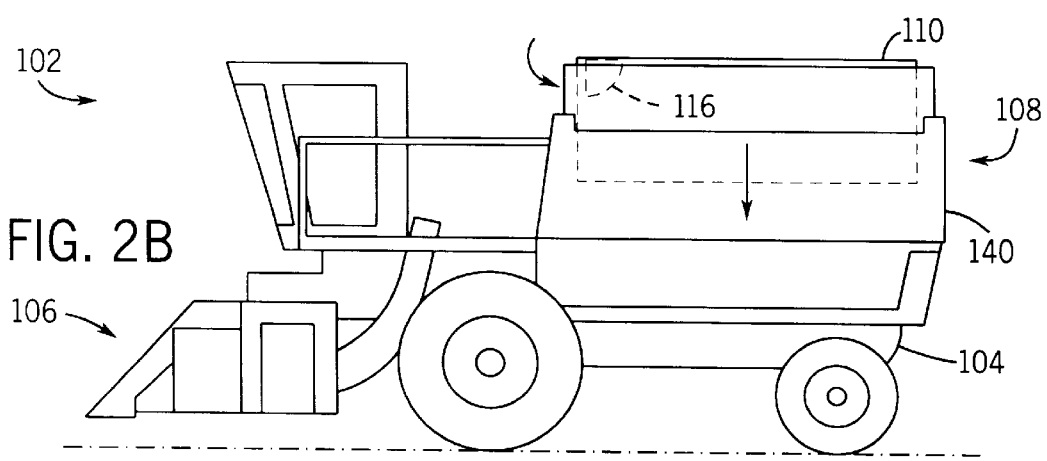
FIG. 2B is a left-side elevation view of the embodiment shown in FIG. 1 in which the hood is in a closed position.

FIG. 2B shows cotton picker 102 in readiness for being shipped (e.g., from the manufacturer to a dealer on a flat-bed rail car or trailer) or for transport (e.g., for being driven down a road from a farmstead to a cotton field or conversely). The height from pavement to top of basket 108 (and hence of cotton picker 102), which is relatively large when cotton picker 102 is configured for operation in a field, may be reduced by lowering basket upper portion 110 within, and with respect to, basket lower portion 140, and interference with overhead objects thereby averted. Chutes 118 are generally at least partially removed from frame 104, as shown. Hood 116, movably secured to basket upper portion 110, projects outside basket upper portion 110 when disposed for operation as shown in FIG. 2A, and is repositioned with respect to basket upper portion 110 as shown in FIG. 2B so that it won't interfere with basket lower portion 140 when basket upper portion 110 is lowered within it.

FIG. 3 shows hood 116 in an opened position with respect to basket 108; i.e., configured for operation of cotton picker 102 so that chute 118 (not shown) may convey cotton bolls into basket 108 through basket opening 114. Hood 116 includes a first end 124 and a second end 126, spaced apart from each other by at least a first member 132 and a second member 134.

Figure 4:
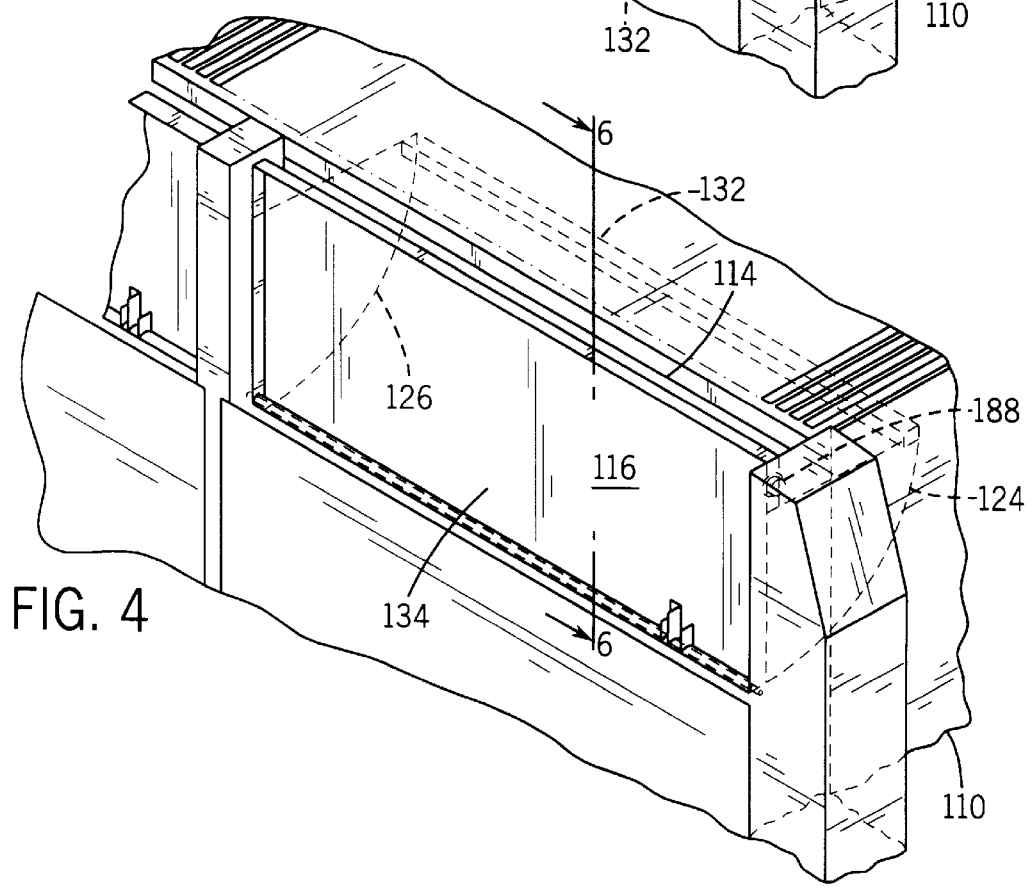
FIG. 4 is a fragmentary perspective view of the portion of the embodiment shown in FIG. 1 and FIG. 3 and in which the hood is in a closed position.

FIG. 4 shows hood 116 in a closed position with respect to basket 108; i.e., configured for transport of cotton picker 102 so that basket upper portion 110 may be lowered within basket lower portion 140 without interference between hood 116 and basket lower portion 140.

FIG. 5 is a sectional view showing hood 116 in an opened position (suitable for operation of cotton picker 102) with respect to basket upper portion 110. Comparison of FIG. 5 with FIG. 6 shows the pivotal relationship of hood 116 with basket upper portion 110, in which hood 116 pivots about a pivot 188 including a shaft 128 and a bearing 130 (both shown also in FIG. 7). A first latching apparatus 136 is associated with the open position of hood 116 and may be mounted to first end 124 and/or second end 126 or to first member 132 as shown. First latching apparatus 136 is engaged with basket upper portion 110 at an aperture (shown in FIG. 8A) to retain hood 116 in the open position.

Members 132, 134 and first and second ends 124, 126 may be constructed using materials and methods well known to those skilled in the art; e.g., sheared and formed low-carbon steel sheet and light structural or roll-formed steel members joined by fillet welding, resistance spot welding, fasteners, or the like. First end 124 and second end 126 may have edges opposite pivot 188 which are in the shape of an arc 182 as shown or of another shape which falls within the envelope of arc 182; e.g., a chord 184.

FIG. 6 is a sectional view showing hood 116 in a closed position (suitable for transport of cotton picker 102) with respect to basket upper portion 110. A second latching apparatus 138 is associated with the closed position of hood 116 and may be mounted to first end 124 and/or second end 126 or to second member 134 as shown. Second latching apparatus 138 is engaged with basket upper portion 110 at an aperture (shown in FIG. 9) to retain hood 116 in the closed position.

FIG. 7 shows a particularly preferred embodiment in which first end 124 of hood 116 is pivotally coupled to basket upper portion 110 by pivot 188 which includes shaft 128 and bearing 130. Bearing 130 may be of any of the suitable bearing or bushing types and materials well known to those skilled in the art. In a particularly preferred embodiment, shaft 128 is a threaded fastener having a turned-down shank and threaded to a boss 148 which has been welded to hood first end 124 as shown. In an alternative embodiment, boss 148 may be welded to basket upper portion 110 instead of to first end 124 and the positions of shaft 128 and bearing 130 reversed. In any preferred embodiment, a similar arrangement of shaft 128, bearing 130, and boss 148 is provided in opposing relationship at second end 126 of hood 116.

FIG. 8A shows a particularly preferred embodiment of first latching apparatus 136 in an engaged position, for retaining hood 116 in an opened position with respect to basket upper portion 110. First latching apparatus 136 is of the barrel, bolt, and keeper type, in which a rod, or bolt, is slidably positionable within a tube, or barrel (which is associated with one of the movable and the stationary members to be latched together) and may be extended from an end of the barrel to engage an aperture, or keeper (which is associated with the other of the movable and the stationary members to be latched together). Sliding the bolt partially out of the barrel into the keeper engages the latch, while sliding the bolt out of the keeper and back into the barrel disengages the latch. Typically, the bolt is provided a handle.

First latching apparatus 136 includes a barrel 152, a rod bolt 158, a tube bolt 174, a rod bolt keeper 150, and a tube bolt keeper 186. First latching apparatus 136 also includes a flange 180, a rod bolt handle 168, a barrel handle 170, and a stop 166. Barrel 152 is of tubular construction, having a particular inside diameter. Tube bolt 174 is affixed to a first end 154 of barrel 152 (e.g., by welding, brazing, bonding, threading and securing with thread retaining compound, or the like). Rod bolt 158 is of a diameter which is slightly smaller than is the particular inside diameter of barrel 152, and is inserted into a second end 156 of barrel 152. A compression spring 164 is contained within barrel 152 between ends of rod bolt 158 and tube bolt 174, so that it biases rod bolt 158 in an extending direction with respect to barrel 152.

First latching apparatus 136 is mounted to and supported by hood 116. Rod bolt 158 is engaged by an aperture 172 within second end 126 of hood 116, and tube bolt 174 is engaged by an aperture 176 within first end 124 of hood 116. First latching apparatus 136 is thus suspended from apertures 172, 176 in hood 116. As shown in FIG. 8A, rod bolt 158 may also engage a stop aperture 178 disposed within stop 166, but stop aperture 178 does not assist in supporting first latching apparatus 136 and in any preferred embodiment is made sufficiently large in diameter to avert undue difficulty in manufacturing of cotton picker 102 relating to alignment of apertures 172, 176, and 178.

Rod bolt 158 is retained from being overextended due to the force of spring 164 by the abutting of a flange 180 against the inner face of second end 126 at aperture 172. Flange 180 may be a hot-formed upset of rod bolt 158, a washer welded to rod bolt 158, a retaining ring or spring clip, or other widening known to those skilled in the art. Barrel 152 is provided a cross section outer dimension (e.g., a diameter or a width across flats of a hex) which is larger than is the diameter of first end 124 aperture 176. Barrel bolt 174 is thereby retained from being similarly overextended by abutting of barrel 152 first end 154 against the inner face of hood first end 124 at aperture 176.

Hood 116 is pivotable with respect to basket upper portion 110 within basket opening 114. A small clearance, or gap 146, exists between first end 124 of hood 116 and an adjacent edge 142 of basket opening 114, and another gap 146 between second end 126 of hood 116 and an adjacent edge 144 of basket opening 114; both are present to avert binding of hood 116 within basket opening 114. Edge 144 includes a keeper 150, configured as an aperture in edge 142, which receives rod bolt 158 in engagement of first latching apparatus 136. Similarly, edge 142 includes a keeper 186, configured as an aperture in edge 142, which receives tube bolt 174 in engagement of first latching apparatus 136.

Still referring to FIG. 8A, a rod bolt handle 168 is affixed to a side of rod bolt 158 and a barrel handle 170 is affixed to a side of barrel 152 (e.g., by welding). Barrel handle 170 is located near second end 156 of barrel 152, and rod bolt handle 168 is located along the length of rod bolt 158 at a distance from barrel handle 170 sufficient to ensure full disengagement of rod bolt 158 from keeper 150 and of tube bolt 174 from keeper 186 when rod bolt handle 168 and barrel handle 170 are drawn toward each other and toward stop 166, affixed to hood 116 at a location between rod bolt handle 168 and barrel handle 170.

FIG. 8B shows first latching apparatus 136 in a disengaged, or unlatched, condition. Although the distance between rod bolt handle 168 and barrel handle 170 is made large enough to cause the disengagement described above, in a particularly preferred embodiment the distance is not made unduly large; i.e., it is also made small enough that a worker can draw handles 168, 170 toward each other with the thumb and fingers of one hand. Moreover, the locations of handles 168, 170 are selected with respect to the location of stop 166, and with respect to each other, so that when bolts 158, 174 are fully disengaged from keeper 150 and keeper 186 (i.e., when handles 168, 170 are full drawn together toward stop 166), bolts 158, 174 are fully withdrawn from keepers 150, 186 respectively but not from second end 126 aperture 172 and first end 124 aperture 176, respectively. The ends of bolts 158, 174 which engage and disengage keepers 150, 186 respectively are disposed within gaps 146 when first latching apparatus 136 is disengaged. First latching apparatus 136 is thereby maintained in engagement with hood 116, and remains supported by hood 116 even when in a disengaged condition.

FIG. 9 shows second latching apparatus 138, used for securing hood 116 in a closed position, installed to hood 116. Second latching apparatus 138 is shown in both disengaged (solid lines) and engaged (phantom lines) positions. Second latching apparatus 138 is shown mounted to, and supported by, hood 116 in the same manner as is first latching apparatus 136, and using the same first end keeper 186 and second end keeper 150. In the particularly preferred embodiment shown in FIG. 9, second latching apparatus 138 is of a configuration which is similar or identical to that of first latching apparatus 136 in order to provide parts commonality and consequent economy of scale in parts manufacturing and inventorying, in manufacturing assembly of cotton picker 102, and in field servicing of cotton picker 102. Second latching apparatus 138 may nonetheless be configured differently, if desired, by those of skill in the art.

While the embodiments illustrated in the FIG's. and described above are presently preferred, it should be understood that these embodiments are offered by way of example only. For example, a hood pivot shaft may be configured as a spring pin, shouldered bolt, a length of steel bar retained by spring clips or retaining rings, etc. The hood pivot shaft may be replaced by one or more hinges; e.g., a length of continuous hinge. First and second latches may be of any of the many known types and styles, and may of same or differing types and/or construction. Similarly, other differences of construction rather than invention will be obvious to those skilled in the art. The invention is not intended to be limited to any particular embodiment, but is intended to extend to various modifications that nevertheless fall within the scope and spirit of the appended claims.

What is claimed is:

1. An agricultural apparatus for the harvesting of a low-density crop such as cotton and comprising:
   a frame;
   a crop acquiring device supported by the frame;
   a crop collecting basket supported by the frame, adjustable in position with respect to the frame, and having an opening for conveying of crop into the basket;
   a conveying device for conveying of crop from the acquiring device to the basket and having a first end associated with the acquiring device and a second end associated with and located at the basket opening;
   a hood having a closed position of the hood wherein the hood is substantially flush with the associated wall of the basket and an open position of the hood wherein the hood extends outwardly from the associated wall of the basket, with the hood pivotally attached to the basket with at least one shaft affixed to one of the hood and the basket at least in the regions of a first end and a second end of the hood, the at least one shaft having a major axis about which the hood is pivotable and a bearing affixed to the other of the hood and the basket in the regions of the first and second ends of the hood and configured to bearingly engage the at least one shaft in the regions of the first and second ends of the hood for guiding conveyance of crop into the basket and for engaging the second end of the conveying device; and,
   a latching apparatus for securing the hood in its open position and a second latching apparatus for retaining the hood in its closed position, with each latching apparatus comprising:
      a single barrel having a major axis disposed parallel to the major axis of the at least one shaft and located at a particular distance from it, the barrel associated with one of the hood and the basket;
      a bolt having a major axis disposed coincident with that of the barrel, the bolt contained at least partially within the barrel and biased with a spring in an engaged position with the bolt movable with respect to the barrel between the engaged position and a disengaged position;
      a second bolt having a major axis which is coincident with the major axis of the corresponding first bolt, the second bolt disposed in the region of the second end of the hood in opposing relationship to the corresponding first bolt, the second bolt further being movable within the barrel between engaged and disengaged positions;
      a keeper, associated with the other of the hood and the basket and including an aperture configured and disposed to receive and engage a first end of the bolt; and,
      a second keeper, configured and disposed to receive in engagement a first end of the second bolt.

2. The agricultural apparatus of claim 1, wherein:
   a second end of the first bolt of the first latching apparatus and a second end of the first bolt of the second latching apparatus are configured for movement within the barrels of the first latching apparatus and of the second latching apparatus respectively;
   a second end of the second bolt of the first latching apparatus and a second end of the second bolt of the second latching apparatus are affixed to second ends of the barrels of the first latching apparatus and of the second latching apparatus respectively; and
   the springs of the first latching apparatus and of the second latching apparatus are disposed within the first barrel and the second barrel respectively, and are abutted by the second ends of the corresponding first and second bolts.

3. The agricultural apparatus of claim 2, further comprising:
   a bolt handle affixed to the first bolt, and a barrel handle affixed to the barrel, of the first latching apparatus, the bolt handle of the first latching apparatus and the barrel handle of the first latching apparatus being configured and disposed to be simultaneously engageable by a hand of a worker for drawing them together in opposition to the force exerted by the spring of the first latching apparatus;
   a bolt handle affixed to the first bolt, and a barrel handle affixed to the barrel, of the second latching apparatus, the bolt handle of the second latching apparatus and the barrel handle of the second latching apparatus being configured and disposed to be simultaneously engageable by a hand of a worker for drawing them together in opposition to the force exerted by the spring of the second latching apparatus;
   a first stop affixed to the hood and located between the bolt handle and the barrel handle of the first latching apparatus and associated with the disengaged positions of the first bolt and the second bolt of the first latching apparatus; and
   a second stop affixed to the hood and located between the bolt handle and the barrel handle of the second latching apparatus and associated with the disengaged positions of the first bolt and the second bolt of the second latching apparatus.

4. In a mobile agricultural apparatus used in harvesting of crop, said apparatus having a basket including a moveable wall having an opening formed therein; the improvement comprising:
   a hood pivotally secured by a pivot shaft at a vertically upper portion of the hood to said moveable wall of the basket at said opening, said hood having a first end and a second end, said hood being movable between a closed position wherein the hood is substantially flush with the associated wall of the basket and an open position wherein the hood extends outwardly from the associated wall of the basket; and
   a first latching apparatus and a second latching apparatus of a barrel, bolt and keeper type, said first latching apparatus being associated with the open position of the hood near the first end of the hood and said second latching apparatus being associated with the closed position of the hood near the first end of the hood, each of said first and second latching apparatus including:
      a barrel having a major axis disposed parallel to the pivot shaft and spaced therefrom;
      a first bolt having a major axis disposed near the first end of the hood and coincident with that of the barrel, the first bolt contained at least partially within the barrel and movable with respect to the barrel between an engaged position and a disengaged position, the bolt having a first end;
      a first keeper including an aperture configured and disposed to receive and engage the first end of the first bolt;

a second bolt having a major axis which is coincident with the major axis of the corresponding first bolt, the second bolt being disposed near the second end of the hood in opposing relationship to the corresponding first bolt, the second bolt further being movable within the respective barrel between engaged and disengaged positions; and a second keeper, configured and disposed to receive in engagement a first end of the second bolt of the first latching apparatus and a first end of the second bolt of the second latching apparatus.

5. The apparatus of claim 4, wherein the first latching apparatus and the second latching apparatus each include a first barrel at least partially containing the corresponding first bolt and a second barrel at least partially containing the corresponding second bolt.

6. In a mobile agricultural apparatus used in harvesting of crop, said apparatus having a basket including a moveable wall having an opening formed therein and a conveying device having a distal end proximate the moveable wall; the improvement comprising:

a formed member pivotally secured to the movable wall of the basket at the opening in the wall, the member having a closed position of the member wherein the member is substantially flush with the associated wall of the basket and an open position of the member wherein the member extends outwardly from the associated wall of the basket, with the member pivotally attached to the basket with at least one shaft affixed to one of the member and the basket at least in the regions of a first end and a second end of the member, the at least one shaft having a major axis about which the member is pivotable and a bearing affixed to the other of the member and the basket in the regions of the first and second ends of the member and configured to bearingly engage the at least one shaft in the regions of the first and second ends of the member for guiding conveyance of crop into the basket and for engaging the distal end of the conveying device;

a first latching apparatus for securing the member in the open position and a second latching apparatus for retaining the member in its closed position, with each latching apparatus comprising;

a single barrel having a major axis disposed parallel to the major axis of the at least one shaft and located at a particular distance from the shaft, the barrel associated with one of the member and the basket;

a first bolt having a major axis disposed coincident with that of the barrel, the bolt contained at least partially within the barrel and biased with a spring in an engaged position with the bolt movable with respect to the barrel between the engaged position and a disengaged position;

a second bolt having a major axis coincident with the major axis of the corresponding first bolt, the second bolt disposed in the region of the second end of the member in opposing relationship to the corresponding first bolt, the second bolt further being moveable within the barrel between engaged and disengaged positions;

a first keeper, associated with the other of the member and the basket and including an aperture configured and disposed to receive and engage a first end of the first bolt; and a second keeper, configured and disposed to receive in engagement a first end of the second bolt.

7. The apparatus of claim 6, wherein:

a second end of the first bolt of the latching apparatus and a second end of the first bolt of the second latching apparatus are configured for movement within the barrels of the first latching apparatus and of the second latching apparatus respectively;

a second end of the second bolt of the first latching apparatus and a second end of the second bolt of the second latching apparatus are affixed to the second ends of the barrels of the first latching apparatus and of the second latching apparatus respectively; and the spring of the first latching apparatus and the spring of the second latching apparatus are disposed within the first barrel and the second barrel respectively, and are abutted by the second ends of the corresponding first and second bolts.

8. The apparatus of claim 7, further comprising:

a bolt handle affixed to the first bolt, and a barrel handle affixed to the barrel of the first latching apparatus, the bolt handle of the first latching apparatus and the barrel handle of the first latching apparatus being configured and disposed to be simultaneously engageable by a hand of a worker for drawing them together in opposition to the force exerted by the spring of the second latching apparatus;

a first stop affixed to the member and located between the bolt handle and the barrel handle of the first latching apparatus and associated with the disengaged position of the first bolt and the second bolt of the first latching apparatus; and a second stop affixed to the member and located between the bolt handle and the barrel handle of the second latching apparatus and associated with the disengaged positions of the first bolt and the second bolt of the second latching apparatus.

9. A cotton harvester comprising:

a mobile frame adapted for movement over a field;

harvesting apparatus mounted on said frame to harvest cotton crop;

a basket supported on said frame to receive cotton crop from said harvesting apparatus, said basket having a moveable wall formed with an opening therein;

a hood pivotally secured to said moveable wall at said opening;

a formed member pivotally secured to a movable wall of the basket at an opening in the wall, the member having a closed position of the member wherein the member is substantially flush with the associated wall of the basket and an open position of the member wherein the member extends outwardly from the associated wall of the basket, with the member pivotally attached to the basket with at least one shaft affixed to one of the member and the basket at least in the regions of a first end and a second end of the member, the at least one shaft having a major axis about which the member is pivotable and a bearing affixed to the other of the member and the basket in the regions of the first and second ends of the member and configured to bearlingly engage the at least one shaft in the regions of the first and second ends of the member for guiding conveyance of crop into the basket and for engaging the second end of the conveying device; and, a latching apparatus for securing the member in its open position and a second latching apparatus for retaining the member in its closed position, with each latching apparatus comprising;

a single barrel having a major axis disposed parallel to the major axis of the at least one shaft and located at a particular distance from it, the barrel associated with one of the member and the basket;

a bolt having a major axis disposed coincident with that of the barrel, the bolt contained at least partially within the barrel and biased with a spring in an engaged position with the bolt movable with respect to the barrel between the engaged position and a disengaged position;

a second bolt having a major axis is coincident with the major axis of the corresponding first bolt, the second bolt disposed in the region of the second end of the member in opposing relationship to the corresponding first bolt, the second bolt further being moveable within the barrel between engaged and disengaged positions;

a keeper, associated with the other of the member and the basket and including an aperture configured and disposed to receive and engage a first end of the bolt; and a second keeper, configured and disposed to receive in engagement a first end of the second bolt.

10. The cotton harvester of claim 9, wherein:

a second end of the first bolt of the latching apparatus and a second end of the first bolt of the second latching apparatus are configured for movement within the barrels of the first latching apparatus and of the second latching apparatus respectively;

a second end of the second bolt of the first apparatus and a second end of the second bolt of the second latching apparatus are affixed to the second ends of the barrels of the first latching apparatus and of the second latching apparatus respectively; and the springs of the first latching apparatus and of the second latching apparatus are disposed within the first barrel and the second barrel respectively, and are abutted by the second ends of the corresponding first and second bolts.

11. The cotton harvester of claim 10, further comprising:

a bolt handle affixed to the first bolt, and a barrel handle affixed to the barrel, of the first latching apparatus, the bolt handle of the first latching apparatus and the barrel handle of the first latching apparatus being configured and disposed to be simultaneously engageable by a hand of a worker for drawing them together in opposition to the force exerted by the spring of the second latching apparatus;

a first stop affixed to the member and located between the bolt handle and the barrel handle of the first latching apparatus and associated with the disengaged position of the first bolt and the second bolt of the first latching apparatus; and a second stop affixed to the member and located between the bolt handle and the barrel handle of the second latching apparatus and associated with the disengaged positions of the first bolt and the second bolt of the second latching apparatus.

* * * * *